US008848879B1

(12) United States Patent
Coughlan et al.

(10) Patent No.: US 8,848,879 B1
(45) Date of Patent: Sep. 30, 2014

(54) CUSTOMIZABLE NOTIFICATION BASED ON RECENT COMMUNICATION HISTORY

(75) Inventors: Marc Coughlan, Balmain (AU); Ralph Warta, Gladesville (AU); Peter D. Runcie, Bilgola Plateau (AU); Ciaran Gannon, Killara (AU); Alexander Forbes, Westleigh (AU)

(73) Assignee: Avaya Inc., Basking Ridge, NJ (US)

( * ) Notice: Subject to any disclaimer, the term of this patent is extended or adjusted under 35 U.S.C. 154(b) by 1799 days.

(21) Appl. No.: 11/743,752

(22) Filed: May 3, 2007

(51) Int. Cl.
*H04M 1/64* (2006.01)
*H04B 1/38* (2006.01)

(52) U.S. Cl.
USPC ........................................ 379/88.12; 455/567

(58) Field of Classification Search
USPC ............................ 379/208.1, 210.02, 210.03, 379/211.01–214.01, 215.01, 88.08–88.21
See application file for complete search history.

(56) References Cited

U.S. PATENT DOCUMENTS

| 6,535,588 | B1 * | 3/2003 | Norcott et al. | 379/91.01 |
| 7,676,027 | B2 * | 3/2010 | Laurent et al. | 379/88.13 |
| 2006/0234728 | A1 * | 10/2006 | Kim et al. | 455/461 |
| 2006/0285661 | A1 * | 12/2006 | Patel et al. | 379/88.16 |
| 2007/0005741 | A1 * | 1/2007 | Hwang et al. | 709/223 |
| 2007/0176742 | A1 * | 8/2007 | Hofmann et al. | 340/7.6 |
| 2007/0264956 | A1 * | 11/2007 | Bicker et al. | 455/186.1 |
| 2008/0205616 | A1 * | 8/2008 | Teng et al. | 379/202.01 |
| 2009/0163184 | A1 * | 6/2009 | Kim et al. | 455/414.1 |

FOREIGN PATENT DOCUMENTS

WO WO2006/026622 3/2006

OTHER PUBLICATIONS

Avaya 4620 IP Telephone User Guide, The Australian National University, retrieved from http://information.anu.edu.au/daisy/infoservices/267/449/460.html on Apr. 17, 2007, 4 pages.
Gibbs, Considerate Computing, Scientific American, 00368733, Jan. 2005, vol. 292, Issue 1, 10 pages.

* cited by examiner

*Primary Examiner* — Fan Tsang
*Assistant Examiner* — Solomon Bezuayehu
(74) *Attorney, Agent, or Firm* — Sheridan Ross P.C.

(57) ABSTRACT

The present invention provides a feature for phones and other communication devices. More particularly, the feature allows a user to customize the notification for an incoming call or contact. The customization may be based on the user's recent communication history with the user currently calling. This allows the user receiving the call to determine its possible importance prior to answering the call or even identifying the caller.

23 Claims, 6 Drawing Sheets

CUSTOMIZABLE NOTIFICATION BASED ON RECENT COMMUNICATION HISTORY

FIELD OF THE INVENTION

The invention relates generally to communication systems and networks. More particularly, the invention relates to call and message notifications.

BACKGROUND

Communication devices, such as cellular phones, pagers, standard phones, computers, laptops, and portable email retrieval devices generate a tone, display a message, or vibrate upon receipt of an incoming call or message. Examples of messages or calls that precipitate such tones or vibrations include live calls, voice messages, instant messages (IMs), emails, video calls, and the like. A communication device, such as a mobile telephone, has a ring function that informs the user of the communication device of incoming calls. The ring function includes various modes such as a vibration mode or a melody mode that outputs a ring tone. Other communication devices have a similar ring function that can be configured to either vibrate or play a melody upon receipt of an incoming message or call. Still other communication devices, such as a computer, laptop, portable email retrieval device, and the like may provide an audible tone upon receipt of a new email or text message, where indication of receipt of the message may correspond to receipt at either the communication device itself or at a communications server (e.g., a voicemail server, an email server, a chat server, or the like).

Conventional communication devices generate a single tone for incoming calls and received messages, regardless of any differences between the call and other calls or the message and other messages. Moreover, many cellular phones support direct downloading of melodies from a melody-providing server via the Internet.

With the proliferation of the variations in ring and alert tones it is not surprising that distinctive rings have become widely adopted by consumers and business telephony customers alike. With the advances in telephony technology, users can now download a plurality of tones, melodies, or other alert modes in the communication device's internal memory for playback during receipt of calls having a predetermined characteristic. Now, communication devices support features that customize the alert or tone based on the caller's identity. In such solutions, the caller ID information triggers a predetermined ring that has been selected by the user of the communication device for the particular caller. After the user selects a ring or alert for a potential caller, the selected ring is either network-actuated (i.e., the network sends the appropriate signal to the user's communication device), or the ring is actuated by software operating on the communication device itself.

On some communication devices, for example, the device interprets the caller ID information associated with an incoming call signal and selects the ring tone that was previously selected to identify that caller. A user may group calling party contacts and associate one or more ring-tones with each group or person in the device's memory.

Present solutions are limited in that they are predetermined for a potential caller. Most solutions do not provide for the customization of a ring-tone or other alert based on situational events. Instead, current solutions focus on the caller's identity as the only criteria for selecting a ring-tone.

As a minor extension of alert notification customization, some prior art systems display how many times a caller appears in its call history. Such an embodiment is limited in that the user is required to look at the display of the communication device to determine how many times a person is listed on their call history. Furthermore, such embodiments may not provide a true indication of the urgency of a call because a user that has called twice in the last two minutes will not appear any differently on the display as a caller that has called two times in the last five days, as long as both callers have two entries in the call history.

There are other exceptions, however. For example, in PCT Application No. WO 2006/026622 to SBC Knowledge Ventures, L.P., the entire disclosure of which is hereby incorporated by reference, a system for establishing flexible customizable tones allows for the customization of a ring-tone based on caller ID information, caller priority, call-urgency (as determined by the caller), and call context. The particular application provides a user with more options for customizing ring-tones but is still limited. One limitation of this particular application is that it relies upon a query and response system, where the caller is required to answer a query regarding whether the call is urgent or not. What is needed is a way to customize ring and alert-notifications based on a number of parameters that do not require a caller's response to an Interactive Voice Response (IVR) unit or the like.

SUMMARY

These and other needs are addressed by various embodiments and configurations of the present invention. The present invention is directed generally to a system, device, and method for customizing a call notification, and more particularly an incoming call notification.

In accordance with one embodiment of the present invention, a method is provided for customizing a call notification based on communication history, the method generally comprising:

determining a threshold period of time;
determining a threshold number of contacts;
a first user receiving a contact from a second user;
determining, for the first user, that a contact history associated with the second user comprises at least the threshold number of contacts occurring within the threshold period of time; and
selecting a priority alert notification for presentation in connection with the contact.

The ability to analyze parameters associated with recent contact history between the initiating user and the intended recipient allows the urgency of an incoming contact to be determined without hassling the initiating user to define a level of urgency. Furthermore, the parameters used to determine contact urgency are objective rather than subjective thereby reducing the possibility that an initiating user will be able to break in to a conversation or prompt an urgent alert notification when the situation does not necessarily warrant such an alert notification.

If an initiator has attempted a plurality of contacts within a relatively recent time frame (e.g., three calls and one email within the last three hours), then any subsequent contacts for the next hour may be determined to be urgent. Of course, the urgency of any contact may also depend on whether the initiator has recently spoken with the intended recipient and many other parameters.

The threshold period of time and number of contacts may be user configurable such that one user may have a different definition of an urgent situation as compared to another user. This provides a certain level of flexibility in customizing alert notification.

The contact history that is referenced may correspond to recent contacts between the intended recipient (e.g., the first user) and the initiating user (e.g., the second user). The contact history may be retrieved from missed call information, an email inbox, a text message database, or any combination thereof.

Embodiments of the present invention afford the unique ability to reference the recent communication history between users, possibly across different communication media in an attempt to determine the urgency associated with a contact. Additionally, the determination of whether a message has been left, and possibly received, may also be factored in to the determination of whether a contact is urgent.

As used herein, a "contact" is understood to include any type of message or attempt at creating a communication session. A contact may include both real-time and non-real-time communication mechanisms such as a phone contact (e.g., analog, digital, VoIP, cellular, or any combination thereof), an email contact, a text contact, a fax contact, a video message contact, a Session Initiation Protocol (SIP) message, or any other IP message known in the art.

As used herein "user" is used to refer to any person or thing that is capable of making use of and/or interacting with a communication device.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to customize call notifications.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a centralized server, at one or more users' premises, or some combination thereof. Similarly, one or more functional portions of the system could be distributed between a server, gateway, PBX, and/or associated communication device.

Figure 1:
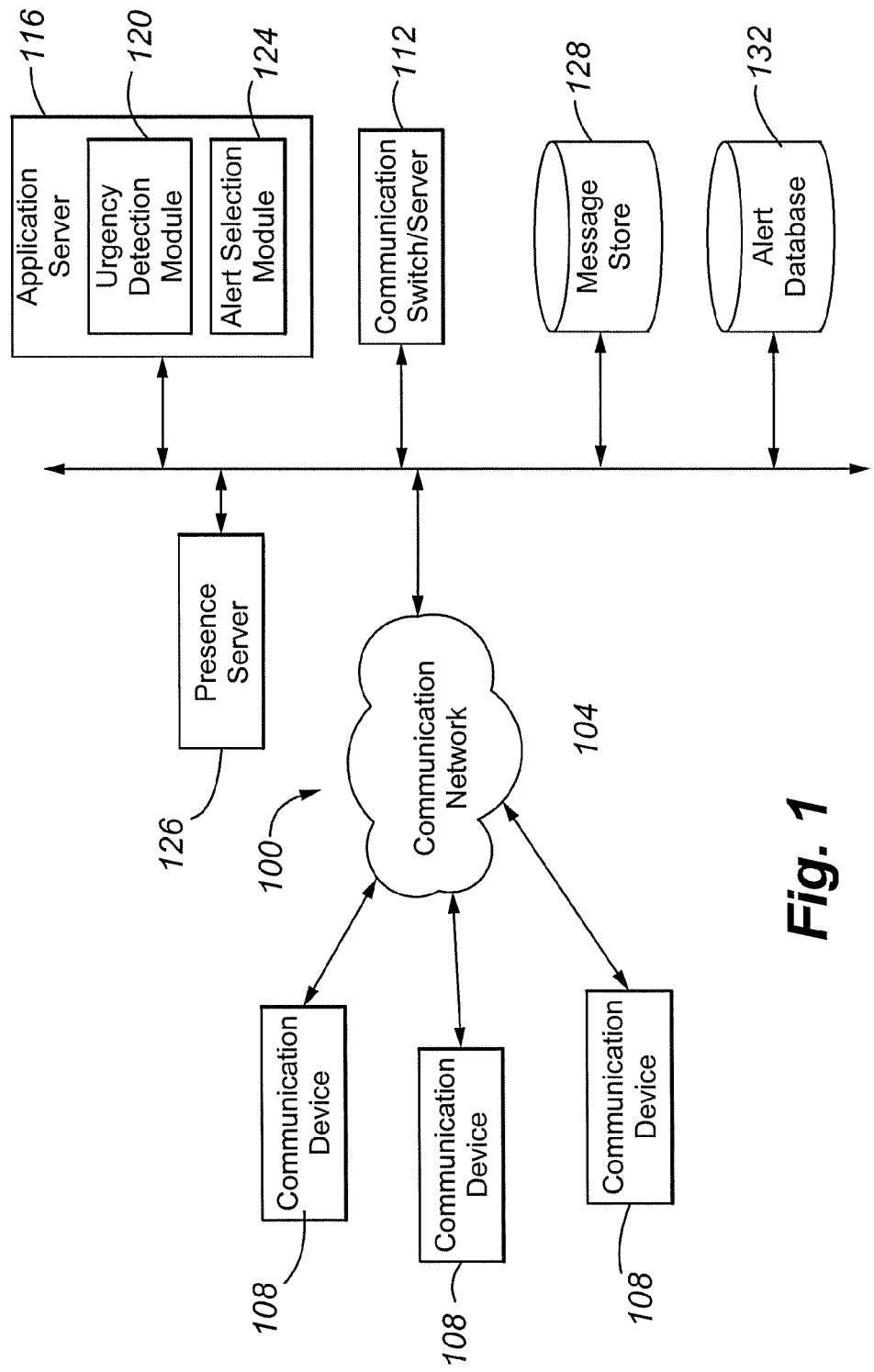
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108, a communication switch/server 112, an application server 116 including an urgency detection module 120 and an alert selection module 124, a message store 128 for storing messages, and an alert database 132.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), the Internet, and any other type of packet-switched or circuit-switched network known in the art. In addition, it can be appreciated that the communication network 104 need not be limited to any one network type, and instead may be comprised of a number of different networks and/or network types.

The communication devices 108 may be packet-switched and/or circuit-switched and can include, for example, IP phones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and the like.

The communication switch/server 112 may comprise a dedicated processor that functions to provide services to client devices (e.g., communication devices 108). The communication switch/server 112 generally enables communications between two or more communication devices 108 connected to the communication network 104. The communication switch/server 112 may comprise any type of processing medium operable to perform instructions stored on an electronic data storage area. The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

If a contact initiator is unable to connect with the intended recipient, the communication switch/server 112 may direct the initiator to leave a message for the intended recipient. The message may be maintained in the message store 128 where it can be later retrieved by the intended recipient. The types of messages that may be maintained on the message store include, without limitation, voice messages, text messages, mails, video messages, and the like. Indications that a message has been left in the message store 128 may be provided to the communication device 108 of the intended recipient. Furthermore, the number of messages left by a particular user may also be maintained in a call history log associated with the intended recipient's communication device 108.

The application server 116 is adapted to provide contact-analyzing capabilities for various endpoints connected to the communication network 104. The application server 116 is characterized by having the ability to monitor and analyze the urgency of contacts received at a communication device 108. In accordance with at least one embodiment of the present invention, the application server 116 is adapted to analyze contacts received at one communication device 108 from another communication device 108, either upon transmission of such contacts by the transmitting communication device 108, upon receipt of such contacts by the receiving communication device 108, or during the routing of such contacts. The application server 116 may analyze both real-time contacts (e.g., phone contacts or chat contacts) and non-real-time contacts (e.g., email messages and text messages).

In accordance with at least one embodiment of the present invention, the application server 116 employs the urgency detection module 120 to determine the urgency of a contact received at a communication device 108 or being transmitted to a communication device 108. The urgency detection module 120 may determine the urgency of a contact based on the number of times that the initiator has attempted to contact the same recipient and the elapsed period of time between the attempts. The urgency detection module 120 may reference the communication history for either the receiving communication device 108 or the sending communication device 108.

In accordance with one embodiment, the urgency detection module 120 may also reference the number of times that a particular user has left a message for another user. If multiple messages have been left for an intended recipient within a predetermined amount of time, and that recipient has not checked their messages or contacted the party trying to contact them, then the urgency of contacts from that user may be increased. The urgency detection module 120 may determine the urgency of a contact based on contact history, message history, whether the intended recipient has recently connected with the contact initiator, initiator priority, contact type (e.g., phone, email, text, chat, etc.), and combinations thereof.

The urgency detection module 120 may be further provided with the functionality to filter various users or communication device 108 from being treated and having their urgency or priority increased. For instance, a user may identify a collection of numbers should never have an urgent alert notification associated therewith. The urgency detection module 120 may identify these numbers upon receipt of a message and determine that no further processing steps are required.

To further the functionality of the urgency detection module 120, a presence server 126 may be provided. The presence server 126 may be adapted to monitor and detect the presence of various users at their communication devices 108 as well as the types of messages transmitted from the communication device 108. The presence server 126 may be useful in identifying which particular user is making use of a communication device 108. This is especially useful in situations where the communication device 108 is a common communication device 108 used by a plurality of users. The presence server 126 may be equipped to determine the identity of a user that is using the communication device 108 and relay such information to the urgency detection module 120.

The application server 116 may then employ the alert selection module 124 to customize the alert notification based on the urgency of the contact as determined by the urgency detection module 120. In accordance with embodiments of the present invention, a user may define, a priori, what type of alert he/she would like to associate with an urgent or high priority contact. There may also be other alerts associated with different levels of urgency. For example, a first type of alert may be used for high priority contacts, a second type of alert may be used for medium priority contacts, and a third alert may be used for normal priority contacts. The alert selection module 124 may also alter the medium used to provide alerts based on their urgency. For instance, the alert selection module 124 may provide silent alerts (e.g., vibration and visual alerts) for normal priority contacts, relatively quiet alerts (e.g., short pulse tones) for medium priority contacts, and more audible alerts (e.g., a full ring tone) for high priority contacts.

As a part of customizing alerts, a user may download certain alerts from the alert database 132. Alternatively, the user may select certain alerts from the alert database 132 that should be used for different priority contacts. In accordance with one embodiment of the present invention, the application server 116 may select and apply the alert notification directly from the alert database 132 when the contact is sent to the recipient communication device 108. Alternatively, the application server 116 may know what types of alerts that the recipient communication device 108 has available for use and can cause the communication device 108 to employ a particular alert for a given contact or contact priority.

It should be emphasized that the configuration of the servers 112, 116, user communication devices 108, and other elements as shown in FIG. 1 is for purposes of illustration only and should not be construed as limiting the invention to any particular arrangement of elements.

Figure 2:
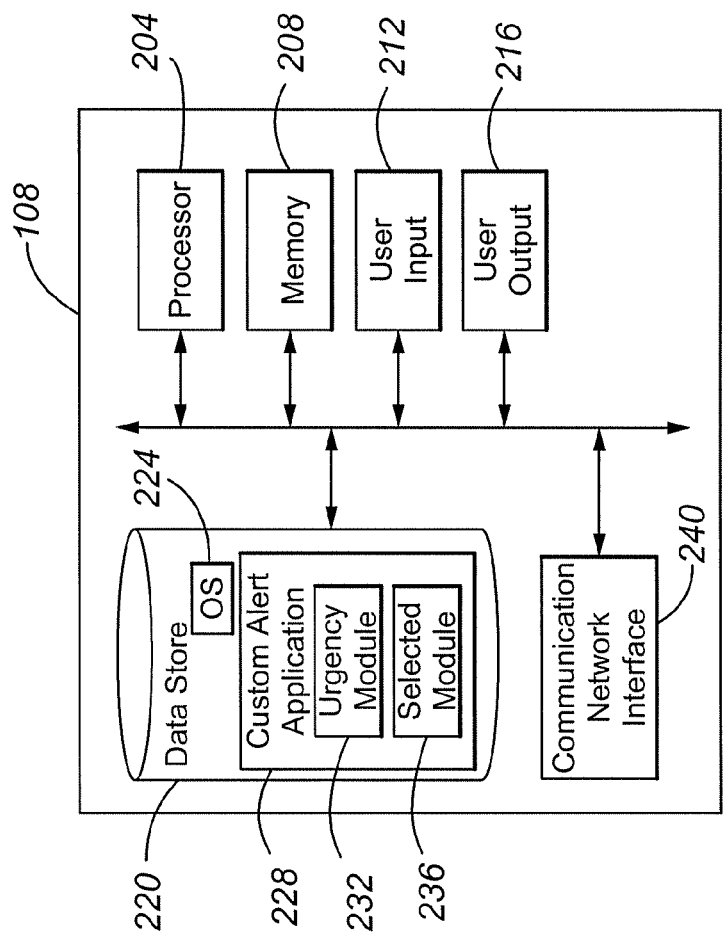
FIG. 2 is a block diagram depicting a communication device in accordance with embodiments of the present invention.

With reference now to FIG. 2, components of a communication device 108, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include a custom alert application 228 that provides functionality similar to the application server 116 described in relation to FIG. 1. The custom alert application 228 resident on the communication device 108 may provide the ability to locally analyze the urgency or priority of contacts received at the communication device 108. After determining the urgency or priority of a contact, the custom alert application 228 may select an alert for use in conjunction with the received contact.

To accomplish the various tasks associated with analyzing a contact for its urgency or priority the monitoring application 228 may be provided with an urgency module 232 and selection module 236. The urgency detection module 232 may be equipped to analyze various parameters associated with an incoming contact. Example parameters that may be considered by the urgency module 232 include, without limitation, contact history (e.g., whether the current intended recipient has recently attempted to contact the current contact initiator, how often the parties communicate, and how many missed contacts there are between the parties), contact frequency (e.g., number of attempted contacts within a period of time, how often between attempted contacts, etc.), initiator priority (e.g., whether the initiator is known, stored as a known contact, listed as a high priority, and so on), message history (e.g., whether messages have been left, whether messages have been retrieved, and what types of messages), connection history (e.g., whether the two parties have communicated with one another since previous contact attempts), and other considerations.

Based on the urgency or priority assigned to a contact by the urgency module 232, the selection module 236 customizes the alert notification accordingly. Possible changes in notification that may be implemented by the selection module 236 include, without limitation, ring tone (e.g., speed, pitch, melody, duration, type, etc.), vibration (e.g., speed, pattern, duration, etc.), visual indicia (e.g., flashing light speed, pattern, duration and other visual messages), or any combination thereof. Various alerts may be chosen from a list of available alerts stored on memory 208 or by altering the alert currently used for normal contact notification. The selection module 236 may further be adapted to prompt a return call for a missed contact. For instance, if an urgent or high priority contact was missed, then the selection module 236 may prompt a return call upon detecting activity of the user in association with the communication device 108. Accordingly, the alert notification may include both a notification of an incoming contact as well as the automatic preparation of a return contact to a missed contact.

The data storage 220 may also contain application programming and data used in connection with the performance of other functions of the communication device 108. For example, in connection with a communication device 108 such as a telephone or IP telephone, the data storage 220 may include communication application software. As another example, a communication device 108 such as a Personal Digital Assistant (PDA) or a general-purpose computer may include a word processing application in the data storage 220. Also, a communication device 108 such as a portable music/video storage and playback device may include applications related to the playback of various stored content such as customized alerts.

A communication device 108 may also include one or more communication network interfaces 240. Examples of communication network interfaces 240 include, but are not limited to, a network interface card, a modem, a wired telephony port, a serial or parallel data port, radio frequency broadcast transceiver, a USB port, or other wired or wireless communication network interfaces.

Figures 3A, 3B:
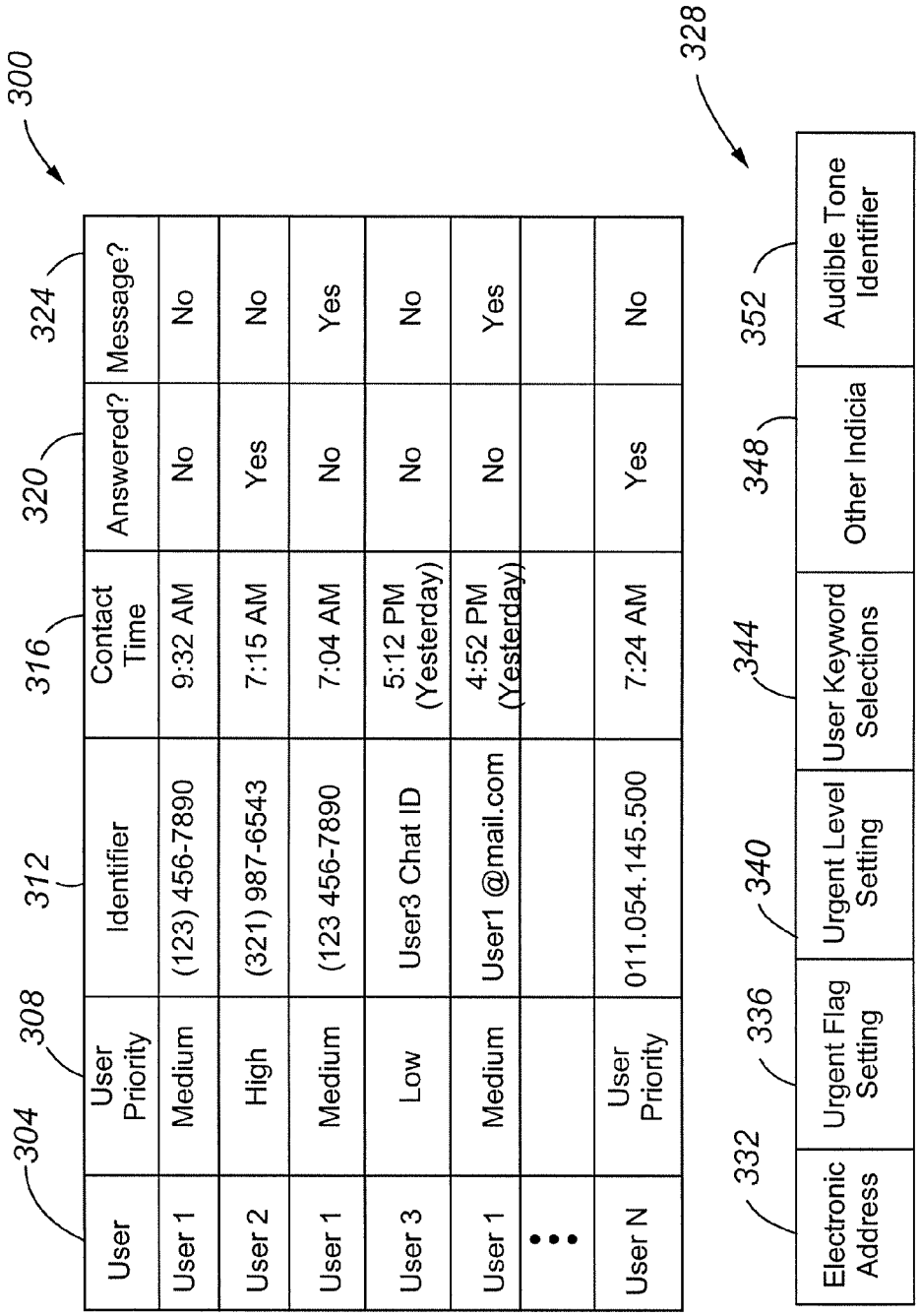
FIG. 3A is a diagram depicting a first data structure used in accordance with embodiments of the present invention.
FIG. 3B is a diagram depicting a second data structure used in accordance with embodiments of the present invention.

With reference to FIG. 3A, a data structure 300 used in accordance with at least some embodiments of the present invention will be described. The data structure 300 may be utilized to store data for determining the urgency or priority of a contact. In accordance with one embodiment of the present invention, the data structure 300 may comprise data from a contact history log. In other words, the data structure 300 may comprise a list of recently received and/or transmitted contacts and associated data for a particular communication device 108. Generally, the data structure 300 may comprise a user field 304, a user priority field 308, an identifier field 312, a contact time field 316, an answered field 320, and a message field 324. The user field 304 may comprise an identification of the user that recently contacted or attempted to contact the subject communication device 108. If the user's name or nickname is stored in a list of known contacts, the stored name may be provided in the user field 304. Alternatively, the name of the user may be retrieved from caller ID information or similar means. However, if the user is not in a list of known contacts and the user name cannot be determined by known mechanisms, then the identifier (e.g., phone number, email address, chat identity, or the like) may be provided in the user field 304.

The user associated with the receiving communication device 108 may predefine the user priority as stored in the user priority field 308. For example, a user may set her husband and children as high priority, her boss as medium priority, and all others as low priority. Alternatively, user priority may be based on whether the other user is in a list of contacts stored on the communication device 108. If the other user is in the list of contacts, then that user may be provided with a higher priority as compared to users not in the list. Still further in the alternative, user priority may be determined based on the hierarchical relationship between the initiator of the contact and the intended recipient.

The identifier field 312 may comprise data related to the communication device 108 associated with the other user. The type of data stored in the identifier field 312 may include a phone number, email address, chat ID, IP address, or any other type of identifier known in the communication arts. Although the data in the user field 304 and identifier field 312 may be the same, it is sometimes useful to maintain the data separately, especially when a single user is associated with more than one communication device 108. In such embodiments, it may be useful to know what type of communication mediums the same user has attempted to utilize in contacting the user associated with the receiving communication device 108. This type of information may also be used to determine the urgency or priority of a contact. For instance, if a user is determined to have initially used email as a communication medium but has recently switched to using a real-time medium such as a phone, then the urgency of contacts from that user may be assigned a higher urgency or priority than if the user continued to use email as a communication medium. Accordingly, changes in communication mediums may also serve as an indicator of contact urgency.

The contact time field 316 may comprise data related to the time of the contact or attempted contact. Knowing the time of a contact is important in determining the urgency of a contact from a given user. For instance, if user A tries to call user B for the fifth time in a relatively short amount of time (e.g., twenty minutes, ten minutes, a minute, or even seconds), this may provide an indication that user A has an urgent request or issue which should be addressed. User B, not necessarily being aware of all five of the previous calls, might be unaware of the fact that user A has called before. User B could also be in a meeting where his notifications are completely turned off (an example of a default notification). Embodiments of the present invention may allow user B to set special rules defining that if an incoming call number is in call history X amount of times within the last X minutes or seconds, then those calls should produce an alert, even if user B has his alerts otherwise de-activated.

As another example, user B may try to call user A, but cannot reach him. This failed contact may be maintained in memory of both users' communication devices 108. Where user A has the failed contact stored as a missed call and user B has the failed contact stored as an unconnected call attempt. If user A tries to call back in a relatively short amount of time, user B most likely will like to take the call even if he is in a meeting. Embodiments of the present invention will can determine that the contact is urgent based on the failed contact information and its relative proximity to a received contact.

In yet another example, user A may be in the shower, on a ladder, in a meeting, or otherwise distracted and cannot check the number displayed on her phone. It is typically reasonable in this instance not to take calls. Nevertheless, repetitive calls from one number or a collection of numbers associated with a common entity could indicate a special circumstance (e.g., an emergency) and based on those circumstances, user A may wish to take such calls. It should be noted that the urgency of a contact may depend upon the call history of the same user. But in alternative embodiments, if a particular user misses a number of contacts from different users associated with a common agency then a contact from any one of those users may be identified as urgent. For instance, if users A, B, and C are all working with user D on a particular project and each of users A, B, and C attempt to call user D in a specified period of time, the next contact from any one of the users A, B, or C may be identified as urgent and a priority alert notification may be provided to user D.

In addition to contact history between users, information such as whether a particular contact was answered or whether a user left a message may also be considered in determining the urgency of a contact. Data related to whether a contact was answered may be maintained in the answered field 320. An affirmative indication in this field may signify that a phone call was received, an email was responded to, or a text message was opened and read. Alternatively, entries in the answered field 320 may also be affirmative if a user has recently spoken to the other user in the recent past. Recent communications may be used as a distinction in determining if someone has called a number of times and not been answered versus another person that has called a number of times and been replied to. Data related to whether the user left a message may be maintained in the message field 324. A contact may be considered relatively urgent if a user has recently left a message and is still trying to contact the same user. Alternatively, if a user has not left a message but is continuing to try and contact the same person, then such contacts may be considered urgent because the user has decided that the communications cannot wait on a message.

Although the data structure 300 has been described from the perspective of a receiving communication device 108 (i.e., in the context of received and missed calls and other contacts), one skilled in the art will appreciate that a similar data structure may be maintained in association with a sending communication device 108. Such a data structure may maintain information related to initiated contacts rather than received contacts. Furthermore, the data structure 300 may maintain information related to both initiated and received contacts for a particular communication device 108, both of which may be useful in determining a particular contact's urgency or priority.

A second type of data structure 328 that may be used in accordance with at least some embodiments of the present invention will now be described with reference to FIG. 3B. The second type of data structure 328 may be used in relation to rules for selecting alert notifications based on contact urgency and/or predefined user preferences in accordance with at least some embodiments of the present invention. It may be possible to assign one or more rules to each contact thereby defining which alert to present to the user based on the notification history. For example, a hierarchy of rules may be implemented where a first rule may cause a default ring tone to be played on a first call from a particular user. A second rule may cause the same default ring tone to be played with increased volume on the second call, if the second call is received within 5 minutes of the first call. A third rule may cause a different ring tone (e.g., ring tone XYZ) to be played on the third call, if the third call is received within 5 minutes of the first call (or possibly within 5 minutes of the second call). A fourth rule may cause another different ring tone (e.g., ring tone ABC) to be played on the fourth call, if the fourth call is received within 30 minutes after the first call (or possibly within 30 minutes of the second or third calls). Alternatively, the fourth rule may also be based on whether the receiving user has attempted to contact the particular user back. If a call is being received from the particular user within 30 minutes of the attempted call back, then the fourth rule may cause ABC ring tone to be played. Then a fifth rule may cause a vibrating alert to be played if the received call corresponds to an SMS message received within 10 minutes of one of the previous contacts.

The data structure 328 may be used in relation to both real-time and non-real-time contacts. In accordance with certain embodiments of the present invention, the data structure 328 may comprise an electronic address field 332, an urgent flag-setting field 336, an urgent level setting field 340, a user keyword selections field 344, other indicia field 348, and an audible tone identifier field 352. Some or all of the data fields 332-348 may be used to store user preference data for received contacts that should receive a predetermined alert notification identified in the audible tone identifier field 352. As can be appreciated by one skilled in the art, if a contact is received that meets the requirements defined by the second data structure 328 for a particular alert notification, then the corresponding alert notification may be used to report the receipt of the subject contact.

All or a portion of the electronic address data may be used to define a requirement. For example, SIP preferences may be utilized to identify certain user names that should receive a particular alert notification. Alternatively, the preferences may be defined to allow any user associated with a particular enterprise (e.g., any user with the email address ending in @enterprise1.com) to have an associated alert notification.

A user may also define urgency settings for a particular alert notification in the urgency flag setting field 336 and/or urgency level setting field 340. Data in these fields may define what alert notification should be used for a contact having a particular urgency as defined by the contact initiator or as determined by the urgency detection module 120.

In addition to urgency settings, a user may define keywords that can be used as an indication of an urgent message. Such keywords may be listed in the keyword selections field 344. The keywords listed in the keyword selections field 344 are generally used to determine the alert notification of text-based messages. A threshold number of keyword occurrences may also be defined in the keyword selections field 344. If the number of keywords in the contact exceeds the threshold, then the identified alert notification may be used to announce the receipt of the contact to the intended recipient.

Other indicia that may be defined by a user for a particular alert notification may be identified in the other indicia field 348. Examples of other indicia that may be defined by the user include, but are not limited to, external factors (e.g., if the initiating user is in an area determined to be under a severe weather alert), time of day (e.g., a contact received at 3:00 AM may be more likely to be an urgent contact than one received at 3:00 PM), and so on.

Figure 4:
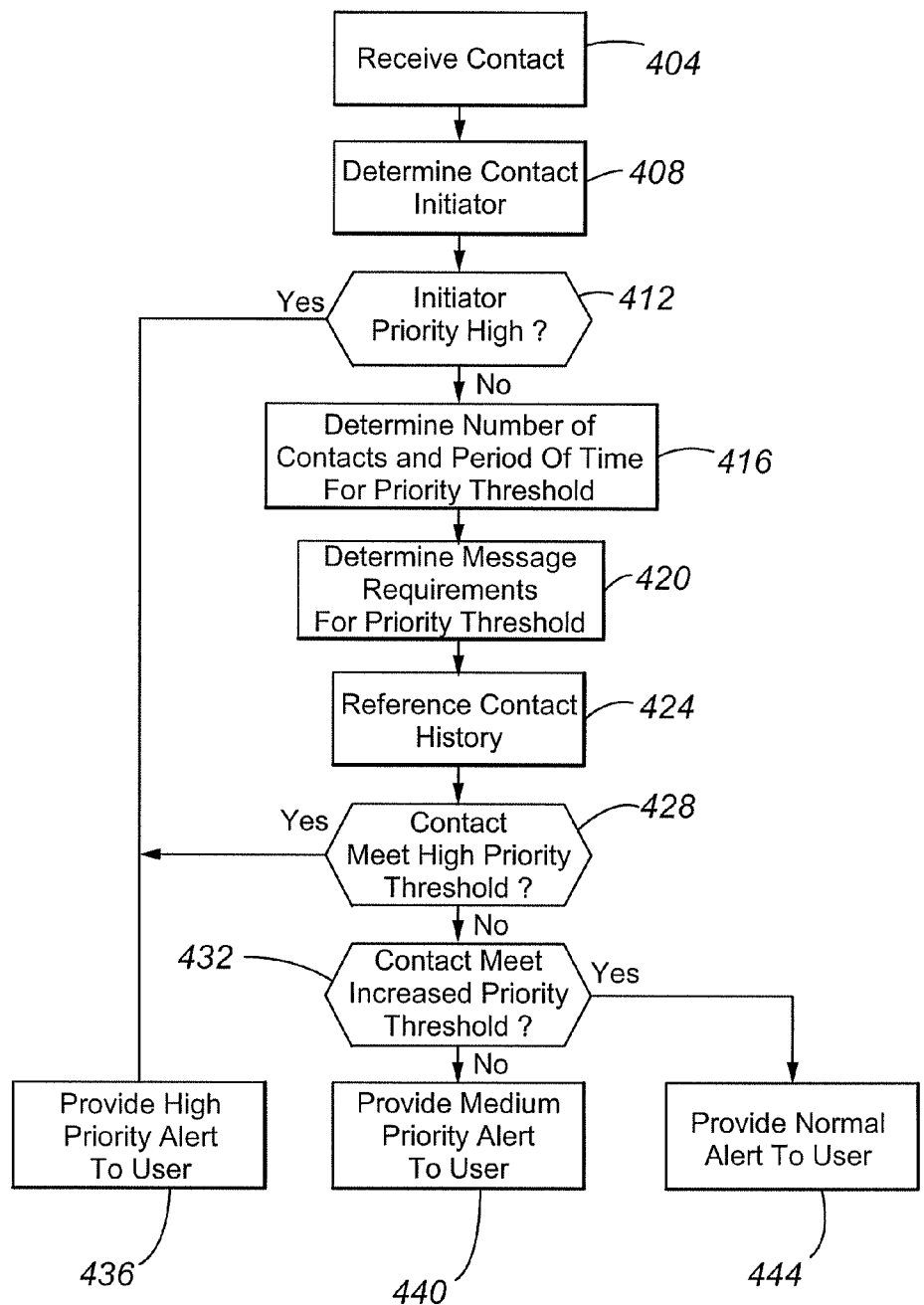
FIG. 4 is a flow diagram depicting a method of customizing an alert notification in accordance with embodiments of the present invention.

Referring now to FIG. 4, a method of customizing an alert notification will be described in accordance with at least some embodiments of the present invention. The method is initiated when a contact is received at a communication device 108 (step 404). The received contact may include a voice contact, a text contact, a video contact, or any combination thereof. Upon receipt of the contact, the urgency detection module 120, 232 determines the identity of the contact initiator, if possible (step 408). The identity of the contact initiator may be determined by referencing a known contacts list or a favorites contact list. Alternatively, the contact initiator may be determined by referencing caller ID information provided concurrently with the contact. If the identity of the contact initiator cannot be determined, then the identity is defined to the granularity of the communication device associated with the initiator (e.g., phone number, extension number, email address, IP address, etc.)

Once the identity of the contact initiator has been determined, then the method continues by determining if the initiator priority is high (step 412). In other words, the initiator's importance, as defined by the intended recipient of the contact, may specify whether the initiator should be given high priority and accordingly should receive a high priority (i.e., high urgency) alert notification. The urgency detection module 120, 232 may reference a known contact list to make the determination of whether the initiator is considered a high priority by the intended recipient. If the initiator is in the known contacts list, then the urgency detection module 120, 232 may automatically assign the initiator a higher priority than an initiator that is not in the list. Additionally, the known contact list may provide an indication of the initiator's priority. The priority listed in the known contacts list may be used to determine if the initiator is a high priority user.

If the initiator is considered a high priority, then the urgency detection module 120, 232 informs the alert selection module 124, 236 that the incoming contact has a high priority and the alert selection module 124, 236 selects and provides a high priority alert notification to the intended recipient (step 436). The high priority alert notification may comprise an alert that is distinct and an indication of a more important contact or a specifically assigned alert for the user based on the level of urgency. The high priority alert notification may comprise a tone, vibration, or visual indicia that differs from the default alert notification in such a way as to make a selected high priority alert notification distinct from other alert notifications.

On the other hand, if the initiator is not considered a high priority, then the urgency detection module 120, 232 continues by determining a threshold number of contacts and a threshold period of time that may be used to define whether the contact is a high priority or increased priority contact (step 416). The determination of a threshold number of contacts and period of time may include determining how many attempted contacts (e.g., unanswered contacts) have to occur within a set period of time. As an example threshold, if a user has called more than twice within the past hour, then any received calls may be considered urgent or if a user has attempted five contacts within the last day, then any received contacts may be considered a higher priority. Additional restrictions on the threshold may be imposed such as whether the user has recently spoken with the intended recipient. For instance, if the user has just spoken with the intended recipient but still has two other calls that have occurred within the last hour, then subsequent contacts received by the user may not be considered urgent until a continuous string of X number of contacts have gone unanswered within the threshold period of time.

The determination of the threshold may depend on many other factors, such as whether messages have been left for the intended recipient and whether the user has changed communication mediums in an attempt to contact the intended recipient. Accordingly, after the frequency of contacts threshold (e.g., the number of required contacts within a certain amount of time) has been determined, the urgency detection module 120, 232 determines the message requirement threshold (step 420). A message requirement threshold may include limitations based on whether the user has previously left a message and whether the user has left different types of messages (e.g., voice messages, email messages, text messages, etc.), when those messages were left, and if the messages have been retrieved. The fact that a user has left messages and is still trying to contact the user may indicate a higher level of urgency. However, if the user has left multiple messages but they have all been viewed or retrieved by the intended recipient, then the intended recipient may not consider contacts from the user urgent, and therefore any subsequent contacts from the user may also be considered non-urgent.

After the urgency detection module 120, 232 has determined the various urgency thresholds, the urgency detection module 120, 232 references the contact history of the intended recipient, although the contact history of the initiator may also be referenced (step 424). In referencing the contact history, the urgency detection module 120, 232 may check the number of contacts, both attempted and successful, between the initiator and the intended recipient and determine if the number and nature of the contacts meets the determined urgency thresholds. Additionally, the urgency detection module 120, 232 may reference which contacts had messages associated therewith and if based on those messages the urgency thresholds are met.

Upon referencing the recent contact history between the initiator and the intended recipient, the urgency detection module 120, 232 determines whether the current contact meets the high priority threshold (step 428). The threshold may comprise rules that consider a combination of the parameters described above (e.g., frequency of contacts, message requirements, continuity of unsuccessful contact attempts, user priority, etc.). Alternatively, the threshold may comprise rules related to a single parameter (e.g., frequency of contacts). The high priority threshold is generally the toughest urgency threshold to meet, for example as compared to the medium priority threshold. The high priority threshold may have requirements of multiple attempted contacts within a couple of minutes or hours of the current contact, whereas a medium priority threshold may have requirements of a couple attempted contacts within a couple of minutes, hours, or days. If the contact meets the high priority threshold, then the urgency detection module 120, 232 relays that information to the alert selection module 124, 236 that selects and provides the high priority alert notification to the intended recipient (step 436).

If the current contact does not meet the high priority threshold requirements, then the urgency detection module 120, 232 determines whether the contact meets the increased priority threshold requirements (step 432). As noted above, the requirements for the increased priority contact (e.g., medium priority contact) may be lower than the high priority requirements but are still higher than a normal priority (i.e., non-urgent) contact. If the contact meets the increased priority threshold, then the urgency detection module 120, 232 informs the alert selection module 124, 236 that the contact is of a medium priority (i.e., medium urgency), at which point the alert selection module 124, 236 selects and prepares a medium priority alert for presentation to the intended recipient along with the contact (step 440). However, if the contact still does not rise to any level of urgency, then the contact is forwarded without additional processing and the default alert notification is provided to the user to indicate the receipt of a contact (step 444).

In accordance with at least some embodiments of the present invention, if the initiator priority level was originally medium and the contact from the initiator met the medium priority threshold requirements, then the urgency of the contact may be increased a level to high priority. In other words, the priority of the initiator may be increased in response to the contact being more urgent but not extremely urgent. Conversely, an initiator with an originally low priority level may have to meet the high priority contact threshold to have their contact rise to high priority. Accordingly, a contact from a medium priority initiator may have different urgency threshold requirements to constitute a high priority as compared to a contact from a low priority initiator. Furthermore, if an initiator with a high priority is not automatically assigned a high priority alert notification, then contact from the high priority initiator may have an even lower threshold to meet the high priority alert notification.

Figure 5:
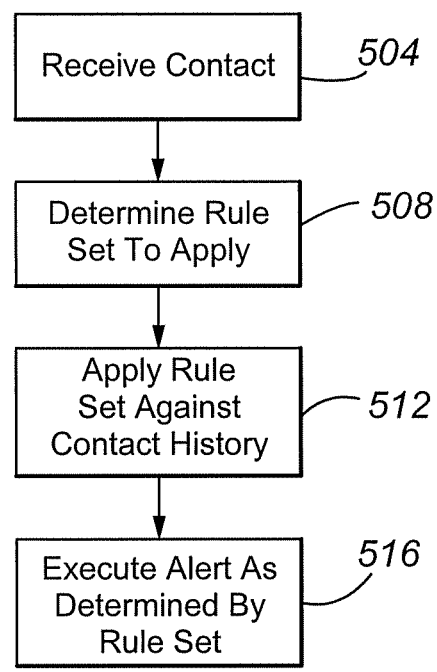
FIG. 5 is a flow diagram depicting a method of applying recent communication history rules to customize an alert notification in accordance with embodiments of the present invention.

FIG. 5 is a flow diagram depicting a method of customizing alert notifications based on applying rule sets in accordance with at least some embodiments of the present invention. The method begins when a contact is received (step 504). As noted above, the contact may correspond to a real-time or non-real-time contact using at least one of text, voice, and video media. The contact may be received from one communication device 108 at another communication device 108 or the application server 116.

After the contact has been received, the urgency detection module 120, 232 is employed to determine which rule set, if any, should be applied to the received contact (step 508). The rule set may define various parameters and thresholds required for a contact to receive a customized alert notification indicating its urgency. Parameters and thresholds of the rule set may correspond to various communication history parameters such as contact frequency, contact type (e.g., call, email, SMS message, etc.), message history, contacting user identity, contacting user settings, keywords, and other indicia. The selected rule set may correspond to a predetermined rule set for a specific user or a default rule set that is to be applied equally to all users.

The urgency detection module 120, 232 in cooperation with the alert selection module 124, 236 then applies the selected rule set against the contact history between the receiving user and the contact initiator (step 512). Application of the rule set may help determine whether the contact history meets certain thresholds. If the contact history meets the predefined thresholds for a particular alert notification, then that alert notification is selected for presentation to the receiving user in connection with the received contact. If the contact history meets thresholds for a number of different alert notifications, then the most urgent (e.g., loudest, most visible, etc.) alert notification is selected for the contact.

Once the rule set has been applied against the contact history, the alert selection module 124, 236 executes the alert as determined by application of the rule set (step 516). In other words, the selected alert notification is provided as an indicator of the received contact. The execution of the alert notification may include vibrating the communication device 108, flashing a display, and/or sounding a ring tone.

Figure 6:
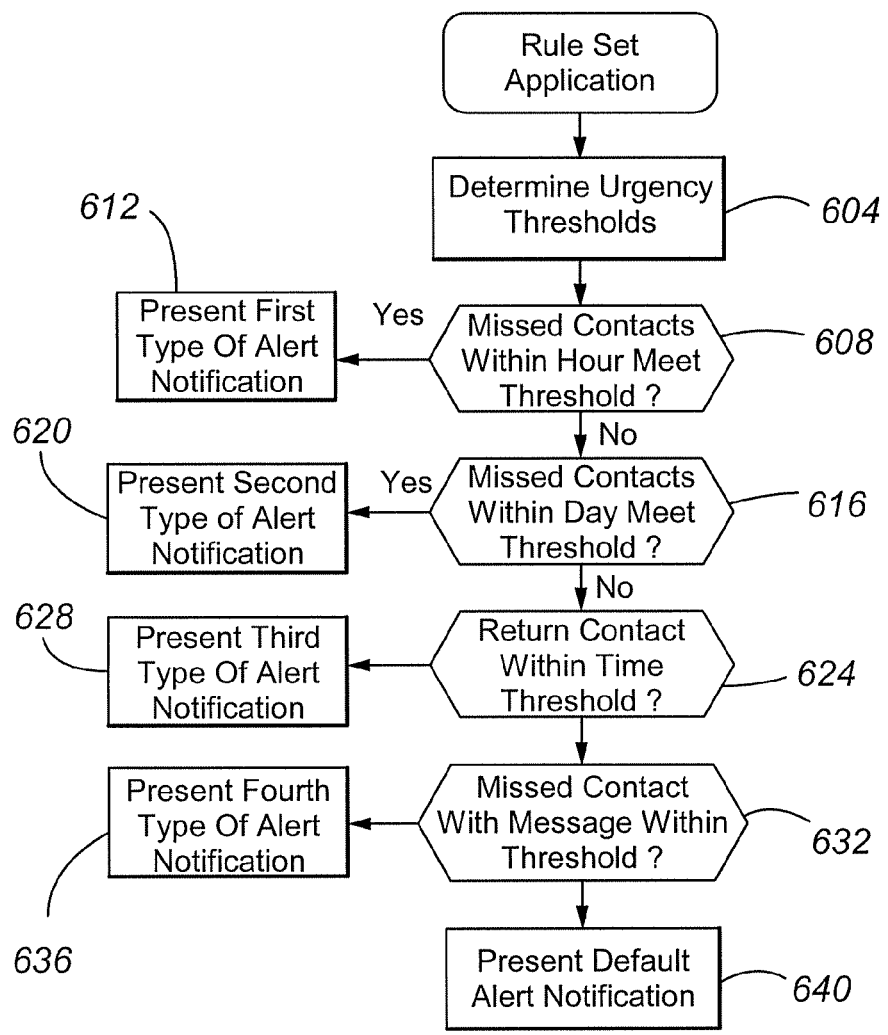
FIG. 6 is a flow diagram depicting a method of selecting alert notifications in accordance with embodiments of the present invention.

Referring now to FIG. 6, a method of applying a rule set against contact history will be described in accordance with at least some embodiments of the present invention. The method is initiated by determining the urgency thresholds for various alert notifications (step 604). A number of alert notifications, which may include combinations of alert notifications (e.g., vibration and ringing, vibration and flashing, ringing and flashing, etc.), may each have different contact history threshold requirements. Those alert notifications that are louder, brighter, or otherwise more noticeable by a user may have higher thresholds as compared to alert notifications that are less intrusive. The thresholds may be defined as binary thresholds (e.g., whether a certain condition has occurred), discrete thresholds (e.g., a number of previous contacts or a number of previous contacts within a predefined time), or continuous thresholds (e.g., frequency of contacts, periodicity of contacts, and so on).

The urgency detection module 120, 232 then determines if the number of missed contacts in the contact history meet a predefined hour threshold (e.g., X number of missed contacts within an hour). The hour threshold may also define a threshold number of missed contacts within a fraction of an hour (e.g., a half-hour) that would also meet the hour threshold. The threshold number of contacts required for a half-hour may be half the number of threshold contacts required for the hour. If the contact history of the initiating party meets the hour threshold requirements, then a first type of alert notification may be presented in connection with the current contact (step 612). The nature of the previous contacts considered for the threshold may include different types of contacts such as voice, text, and video contacts.

If the hourly threshold has not been met, then the urgency detection module 120, 232 continues by determining if the contact history meets a daily threshold (step 616). The requirements for the daily threshold may correspond to an equivalent of the hourly threshold but for the entire day. Alternatively, the daily threshold may be slightly lower than the daily equivalent of an hourly threshold. If the daily threshold has been met, then a second type of alert notification may be provided in connection with the received contact (step 620). The second type of alert notification may be less noticeable than the first type of alert notification, especially if the requirements of the daily threshold are not as strict as the hourly requirements.

If the daily threshold has not been met, then the urgency detection module 120, 232 determines if the current contact corresponds to a return call and if that return call is within a threshold amount of time (step 624). The urgency detection module 120, 232 may refer to the contact history between the initiator and the intended recipient to see if the current intended recipient recently attempted a contact with the current initiator and failed in that attempt. If the current contact appears to be a return call, and the return call is within a predefined amount of time from the return call, then a third type of alert notification may be provided in connection with the received contact (step 628). This particular alert notification may be distinguishable from the first and second alert notifications based on one or more of volume, tone, vibration pattern, vibration intensity, and visual displays.

If the current contact does not meet the return call threshold, then the urgency detection module 120, 232 determines if the contact history has any messages such as voicemail, unread email, or unread text messages associated with missed contacts (step 632). If the contact history between the participants does include messages and the current contact is within a threshold amount of time of contact having a message associated therewith, then a fourth type of alert notification is provided in connection with the received contact (step 636). The fourth type of alert notification may be unique from the other types of alert notifications thereby allowing the user to know that the received contact has a message history as opposed to meeting other urgency thresholds. On the other hand, if the contact history does not meet the message threshold, then a default alert notification may be presented to the user to signal receipt of the contact.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for providing a customized alert notification. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of customizing contact alert notifications, comprising:
   a processor determining a threshold period of time;
   the processor determining a threshold number of contacts, wherein the threshold number of contacts is based on at least two contacts from at least two different users who are part of a common agency;
   a first user receiving a first contact from a second user;
   the processor determining, for the first user, that a consolidated contact history, for the first user, includes at least a second contact that has been received from the second user, wherein the consolidated contact history includes contacts from two or more communication media the processor determining that the first contact and the second contact are received from different types of communication media types;
   the processor determining that the first contact and at least the second contact are more than the threshold number of contacts occurring within the threshold period of time; and
   the processor selecting a priority alert notification for presentation in connection with the first contact.

2. The method of claim 1, wherein determining the contact history comprises determining that at least one of the second user and users associated with the second user have attempted at least the threshold number of contacts with the first user within the threshold period of time.

3. The method of claim 2, wherein attempted contacts comprise at least one of missed calls, unread email messages, unread text messages, and voicemails initiated by at least one of the second user and users associated with the second user.

4. The method of claim 1, wherein the threshold period of time comprises an amount of time prior to the first user receiving the contact from the second user.

5. The method of claim 1, further comprising:
   forwarding the contact to a communication device associated with the first user; and
   presenting the priority alert notification to the first user via the communication device.

6. The method of claim 1, further comprising:
   determining a priority level associated with the second user for contacts with the first user;
   determining a default alert notification associated with the second user;
   in response to determining the contact history, increasing the priority level associated with the second user for the contact; and
   altering the default alert notification.

7. The method of claim 1, wherein the type of communication medium is a factor in whether to generate a priority alert notification.

8. A communication device, comprising:
   an urgency detection module adapted to:
   identify, for a first entity, when a received first contact from a second entity comprises a heightened state of urgency;
   search a consolidated contact history for contacts from the second entity, wherein the consolidated contact history includes contacts from two or more types of communication media;
   based on the search of the consolidated contact history, identify one of at least three heightened states of urgency by determining that the second entity has had at least a predetermined number of contacts with the first entity occurring within a predetermined period of time;
   determine that the predetermined number of contacts occurring within the predetermined period of time are based on the first contact from the second entity and a second contact from a third entity who are part of a common agency and wherein at least the first contact and the second contact from are sent over different types of communication media; and
   an alert selection module adapted to prepare an alert notification for the received contact based on the urgency of the received contact as determined by the urgency detection module.

9. The device of claim 8, wherein the first entity comprises at least one of a single user and a collection of users and wherein the second entity comprises at least one of a single user and a collection of users.

10. The device of claim 8, wherein the alert selection module is adapted to select an urgent alert notification, associated with the at least one heightened state of urgency, in response to the urgency detection module determining that the received contact comprises the at least one heightened state of urgency.

11. The device of claim 10, wherein the urgent alert notification comprises at least one of a ring tone, a vibration, and a visual indicia that differs from a default alert notification.

12. The device of claim 8, wherein the urgency detection module is further adapted to determine a priority level associated with the second entity for contacts with the first entity and increase the priority level associated with the second entity for the contact in response to determining that the received contact comprises the at least one heightened state of urgency.

13. The device of claim 12, wherein the urgency detection module is adapted to determine a priority level associated with the second entity by referencing a known contact list associated with the first entity.

14. The device of claim 8, wherein the urgency detection module is further adapted to consider the contact medium used in identifying the at least one heightened state of urgency for the contact.

15. An non-transitory computer readable medium including computer-executable instructions, which when executed by a processor, cause the processor to conduct a method for customizing contact alert notifications, the instructions comprising:
   instructions to receive a contact for a first entity from a second entity;
   instructions to access a consolidated contact history associated with the first entity, wherein the consolidated contact history includes information about contacts having two or more communication media types, wherein the contact history includes:

a user field operable to store an identification of a user that attempted a contact;

an identifier field operable to store communication device data associated with the user, wherein the communication device data identifies one of two or more contact types;

a contact time field operable to store a time of the attempted contact;

based on the received contact and the consolidated contact history, instructions to identify that the received contact comprises a heightened state of urgency, wherein identifying the heightened state of urgency includes determining that the second entity has had at least a predetermined number of contacts with the first entity within a predetermined period of time; and instructions to select an alert notification based on an urgency of the highlighted state of urgency of the received contact, wherein selection of the alert notification is also based on a threshold that is based on at least two contacts from at least two different users who are part of a common agency.

16. The computer readable medium of claim 15, wherein the instructions to select includes instructions to select between a high urgency, a medium urgency alert notification for contacts having a medium urgency, and a default alert notification for contacts having a low urgency.

17. The computer readable medium of claim 16, wherein at least one of the high urgency alert notification and the medium urgency alert notification comprise at least one of a ring tone, a vibration, and a visual indicia that differs from the default alert notification.

18. The computer readable medium of claim 15, wherein the instructions to identify that the received contact comprises the heightened state of urgency includes instructions to determine the contact type of at least one attempted contact.

19. The computer readable medium of claim 18, wherein the contact type comprises at least one of missed a phone call, an unread email message, an unread text message, and a voicemail initiated by the second entity.

20. The computer readable medium of claim 15, wherein the contact history further includes:

a user priority field operable to store a priority, assigned by the user, associated with the attempted contact;

a message field operable to store a message associate with the attempted contact; and wherein the heightened state of urgency is based, at least in part, on the priority or a keyword in the message.

21. The method of claim 1, wherein the priority alert notification is based on whether the first user answered a prior contact with the second user.

22. The method of claim 1, wherein the priority alert notification is based on a hierarchical relationship between the first user and the second user.

23. The method of claim 1, wherein the priority alert notification is based a time since the second user has communicated with the first user.

* * * * *